US006246783B1

(12) United States Patent
Avinash

(10) Patent No.: US 6,246,783 B1
(45) Date of Patent: Jun. 12, 2001

(54) ITERATIVE FILTER FRAMEWORK FOR MEDICAL IMAGES

(75) Inventor: Gopal B. Avinash, New Berlin, WI (US)

(73) Assignee: General Electric Company, Milwaukee, WI (US)

( * ) Notice: Subject to any disclaimer, the term of this patent is extended or adjusted under 35 U.S.C. 154(b) by 0 days.

(21) Appl. No.: 08/932,430

(22) Filed: Sep. 17, 1997

(51) Int. Cl.[7] .................................................. G06K 9/00
(52) U.S. Cl. ........................... 382/128; 382/260; 708/322
(58) Field of Search ........................... 382/100, 128–134, 382/168–172, 173, 190, 191–192, 199, 205, 206, 210, 211, 216, 217, 218, 254, 256, 257–266, 279, 282, 308, 265, 276; 378/1, 62–63; 250/370.08, 370.09, 370.1, 370.11; 345/425; 348/665–668; 358/450; 359/559; 600/300, 544, 587; 708/300, 320, 322; 73/602, 606

(56) References Cited

U.S. PATENT DOCUMENTS

| | | | |
|---|---|---|---|
| 4,590,582 | 5/1986 | Umemura | 708/308 |
| 4,691,366 | 9/1987 | Fenster et al. | 382/266 |
| 4,761,819 | 8/1988 | Denison et al. | 382/261 |
| 4,834,964 | 5/1989 | Rosen | 424/9 |
| 4,972,256 | 11/1990 | Hirosawa et al. | 358/80 |
| 4,991,092 | 2/1991 | Greensite | 382/131 |
| 5,050,227 | 9/1991 | Furusawa | 382/269 |
| 5,063,607 | 11/1991 | FitzHenry et al. | 382/274 |
| 5,072,314 | 12/1991 | Chang | 359/559 |
| 5,081,692 | 1/1992 | Kwon et al. | 382/263 |
| 5,218,649 | 6/1993 | Kundu et al. | 382/180 |
| 5,289,126 * | 2/1994 | Mori et al. | 324/309 |
| 5,351,305 | 9/1994 | Wood et al. | 382/6 |
| 5,404,167 * | 4/1995 | Bist et al. | 348/398 |
| 5,563,962 * | 10/1996 | Peters et al. | 382/261 |
| 5,579,444 * | 11/1996 | Dalziel et al. | 395/94 |
| 5,602,934 * | 2/1997 | Li et al. | 382/128 |
| 5,734,740 * | 3/1998 | Benn et al. | 382/132 |
| 5,740,268 * | 4/1998 | Nishikawa et al. | 382/132 |
| 5,748,792 * | 5/1998 | Wober | 382/263 |
| 5,819,288 * | 10/1998 | De Bonet | 382/128 |
| 5,825,909 * | 10/1998 | Jang | 382/132 |
| 5,832,055 * | 11/1998 | Dewaele | 378/62 |
| 6,018,753 * | 1/2000 | Kovacevic et al. | 708/313 |

OTHER PUBLICATIONS

Gonzalez et al. (Spatial Filtering, Digital Image processing, 1992, pp. 196–197.*
*Image Enhancement: A Review*, T.S. Huang, Dept. Of Electrical Engineering & Research Lab. Of Electronics, Mass. Institute of Technology, Mass. USA, pp. 49–59
*Computer Graphics and Image Processing*, L.S. Davis, (1975) 4, 248–270.
*Computer Graphics and Image Processing*, M. Nagao & T. Matsuyama, 9, 394–407 (1979).

\* cited by examiner

Primary Examiner—Jayanti K. Patel
(74) Attorney, Agent, or Firm—Quarles & Brady; Christian G. Cabou; Phyllis Y. Price

(57) ABSTRACT

Functional filter elements are linked in a multi-pass filter framework that forms part of an MRI system. The filter framework is configured by a set of parameters selected by the operator to perform smoothing and edge sharpening functions on acquired MR images. The functional filter elements used during each pass through the filter framework and the number of passes through it are configurable to obtain a wide variety of visual effects on medical images.

17 Claims, 3 Drawing Sheets

ITERATIVE FILTER FRAMEWORK FOR MEDICAL IMAGES

BACKGROUND OF THE INVENTION

The field of the invention is medical imaging, and particularly, the filtering and enhancement of medical images to improve their visual quality.

The quality of medical images is a function of the imaging modality used and the particular method used to acquire the image data. As a general matter, regardless of the imaging modality used, the quality of medical images can be improved by acquiring redundant data which can be averaged to reduce the effects of random noise. Unfortunately, this solution results in an increased scan time that inconveniences the patient and is expensive. Another approach is to increase the power of the imaging system. In MRI this may take the form of a stronger polarizing field (e.g. 1.5 Tesla instead of 0.5 Tesla), in x-ray systems this can take the form of a higher power x-ray beam, and in ultrasound this may take the form of a more powerful rf amplifier and transducer. These measures drive up the cost of the equipment, and in the case of x-ray, increase the dose of ionizing radiation to the patient.

Attempts have been made to improve the imagability of the subject by injecting contrast agents into the patient. See for example, U.S. Pat. No. 4,834,964 of Rosen. However, injected contrast agents only improve a limited range of image characteristics, and because it is as an invasive technique, it is sometimes inappropriate for medical reasons.

Acquired medical images can also be processed to enhance their clinical value by modifying with the histogram or distribution of signal values on a global or local basis as described, for example, in U.S. Pat. No. 5,063,607. In other enhancement techniques, the gray scale range of each sub-image region is stretched such that it covers the entire display range as, for example, in U.S. Pat. No. 4,991,092. However, histogram modifications which expand the dynamic range of the data, also increase the noise in the image. Local histogram modifications cause a blocking effect that results in a lack of uniformity over the entire image.

Images may be enhanced using convolution or filtering techniques. Such techniques include the amplification of selected frequency bands as illustrated in U.S. Pat. No. 5,072,314 of Chang. Others have used a combination of high and low pass filtering to enhance images as illustrated for example in U.S. Pat. No. 5,081,692 to Kwon or U.S. Pat. No. 4,972,256 to Hirosawa. However, global filtering techniques tend to blur the images and eliminate the lower frequency regions. This makes clinical evaluation of the images difficult.

To eliminate some of the drawbacks of global filtering or convolution, locally adjusted filtering may be used. See for example, U.S. Pat. No. 4,761,819 of Denison, et al.; U.S. Pat. No. 4,991,092 of Swon; U.S. Pat. No. 5,050,227 of Furusawa and "Adaptive Smoothing: A General Tool For Early Vision", IEEE Transactions on Pattern Analysis and Machine Intelligence, Vol. 13, No. 6, June 1991, Saint-Marc, et al. However, the local filtering techniques have difficulty distinguishing between sudden image variations attributable to edges and sudden image variations attributable to noise. These techniques also fail to account for differences in edge direction and regional variance, producing an image which is overly smooth without consideration of the edges.

Restoration approaches may also be used in which the acquisition process is modeled and the degradation of the imaging process described mathematically. These techniques then attempt to invert the degradations using restoration techniques such as least squares, Bayesian, or Kalman filtering. However, the restoration methods require an accurate model for the acquisition process. Complicated acquisition processes, such as MRI imaging are too difficult to model accurately, and the parameters of a complicated model for a given image can require lengthy iterative computations.

U.S. Pat. No. 4,691,366 of Fenster, et al. uses filters which are adjusted to enhance long edges and attenuate noise and points. However, this technique requires an analysis of the imaging system in order to produce the appropriate filters. Such analysis is computationally intensive, time consuming, and prone to errors.

SUMMARY OF THE INVENTION

The present invention is a multi-pass filter framework which is employed to improve the quality of medical images. More particularly, the multi-pass filter framework includes storage means for storing the acquired image data, a plurality of separate filter functions for receiving the acquired image data in a pass therethrough to produce corresponding filtered image data, scaling means for multiplying the filtered image data by a constant ($\alpha$), summing means for combining filtered and original image data by appropriate scaling to produce an output image; and iteration means for passing the image data through selected filter functions a plurality of times. The filter functions can take many different forms to tailor the multi-pass filter to many different imaging modalities and clinical applications.

A general object of the invention is to enhance the quality of medical images without the addition of special hardware or significantly increasing the image processing time. By using the multi-pass filtering of the image data, the separate filtering functions may be considerably simplified. For example, rather than filtering with 15×15 element filter kernels, the same result can be accomplished in three passes through the framework which uses a 3×1 element filter kernel. This translates into simplified and faster processing. Also, by using the multi-pass technique the filter can be changed for each pass to provide a much greater range of image effects.

A more specific object of the invention is to improve the quality of images acquired with an MRI system. Noise may be filtered from the image data using a directional smoothing filter that is sensitive to edges in the image. The edges are smoothed along them, but their sharpness is not reduced. Segmentation may be used to differentially filter regions with strong and weak edges. These different filter functions may be employed in different combinations during the multiple passes through the filter framework.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 3:
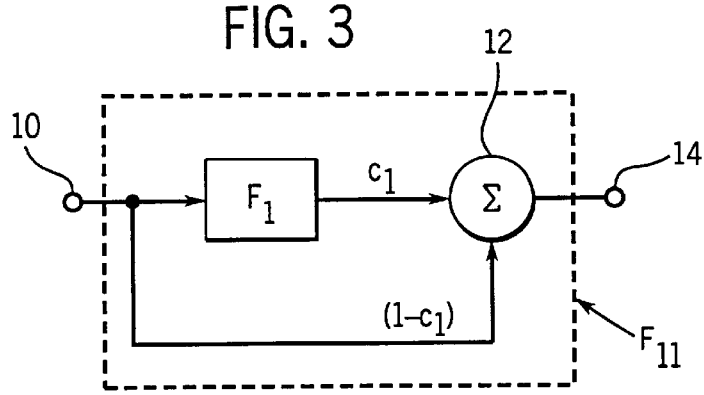
FIG. 3 is a block diagram of a one-pass filter according to the present invention.

The present invention is a filter framework which can be configured by the user to implement a wide range of filtering operations on medical images. Referring particularly to FIG. 3, the framework is formed around a basic filter block $F_{11}$ which is comprised of a filter $F_1$ that operates on input image data input at 10. The output of filter $F_1$ is scaled by a factor $C_1$ and is combined at summer 12 with scaled input image data. The scaling factor for the input image data is (1-C). The output 14 of the filter block $F_{11}$ is intermediate image data that has undergone one pass of first degree filtering. The filter $F_1$ may be relatively simple in construction such as a smoothing or sharpening filter using a 3×1 filter kernel, or it may be a combination of different filters that can be selectively employed during each pass.

Figure 4:
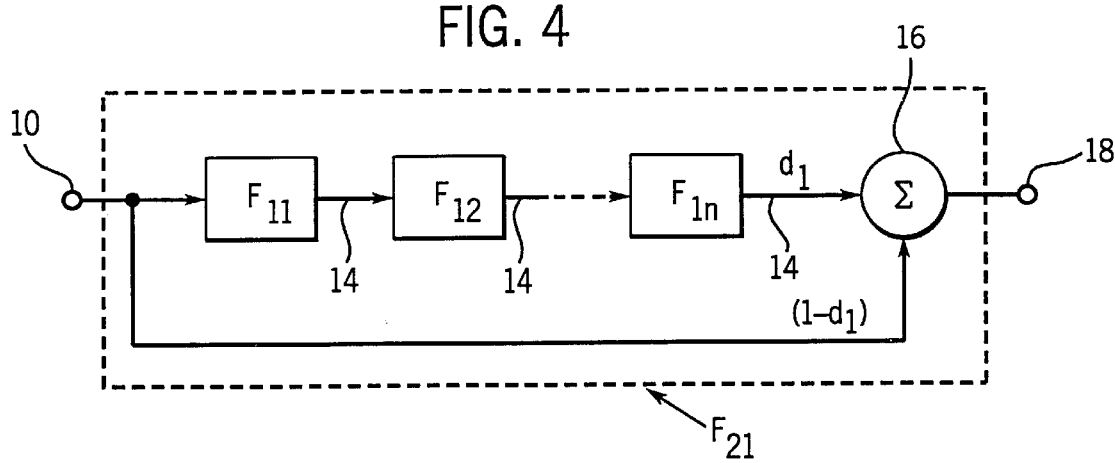
FIG. 4 is a block diagram of a multi-pass first order filter using the one-pass filter of FIG. 3.

The filter framework uses the filter block in FIG. 3 to form a multi-pass filter $F_{21}$ such as that shown in FIG. 4. The intermediate image data is fed back into the filter block for another pass, and the particular filter function and the scaling factor C used may be different during each pass. Any number (n) of passes may be performed, as illustrated in FIG. 4, and after the last pass, the filtered output image data is scaled by a scaling factor (d) and combined with scaled original input image data at summer point 16. The filtered image data is output at 18. As will be described in detail below, the preferred embodiment of the invention is a three-pass (i.e. n=3) filter for use with image data acquired with an MRI system.

Figure 5:
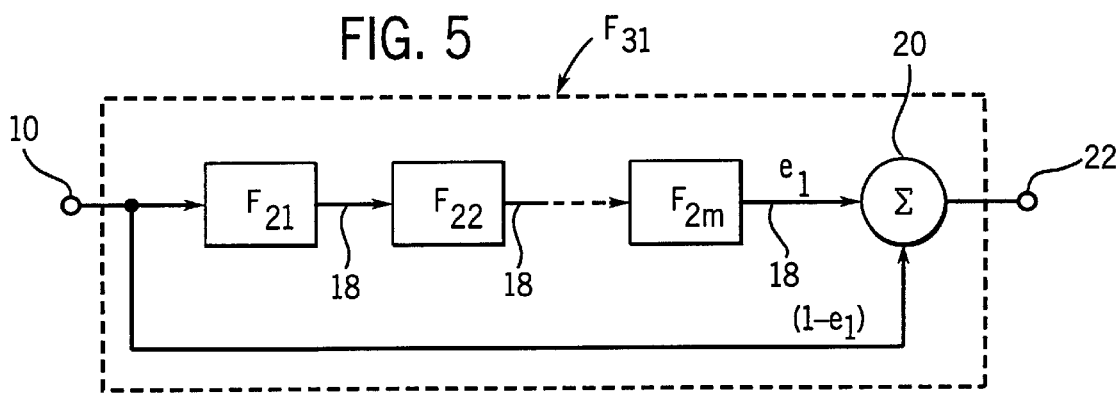
FIG. 5 is a block diagram of a multi-pass second order filter using the filter of FIG. 4.

With particularly noisy images it may be necessary to provide a second degree filter. Referring particularly to FIG. 5, this can be achieved with the filter framework of the present invention by concatenating multi-pass filter blocks such as filter $F_{21}$ in FIG. 4. The output 18 of each multi-pass filter block $F_{21}$, $F_{22}$ . . . $F_{2m}$ is fed back through the framework to provide the input to the next filter block in the chain. The output 18 of the last filter block $F_{2m}$ is scaled by a scaling factor (e) and combined with scaled original input image data at summing point 20. The filtered image data is output at 22. It should be apparent that the second order filter $F_{31}$ can itself be concatenated to form still higher order filters as needed to provide the desired image effects.

While the summing points 12, 16 and 20 may be as simple as the arithmetic sum of the scaled pixel intensities, it is also possible to segment the image into different regions and combine the regions with the original image. Regions with strong edges, for example, may not be combined, whereas regions with weak edges may be combined with corresponding data in the original image.

Another aspect of the present invention is the ability to configure the filter framework to provide the desired filter functions. A set of parameters control the filter framework to provide the filter blocks and concatenate them as described above. These parameters select the particular filter function to be performed during each pass, and select the value of the scaling factors $c_1$–$c_n$, $d_1$–$d_n$, etc. Stored sets of parameters may be used to configure the filter framework for particular medical applications.

DESCRIPTION OF THE PREFERRED EMBODIMENT

Figure 1:
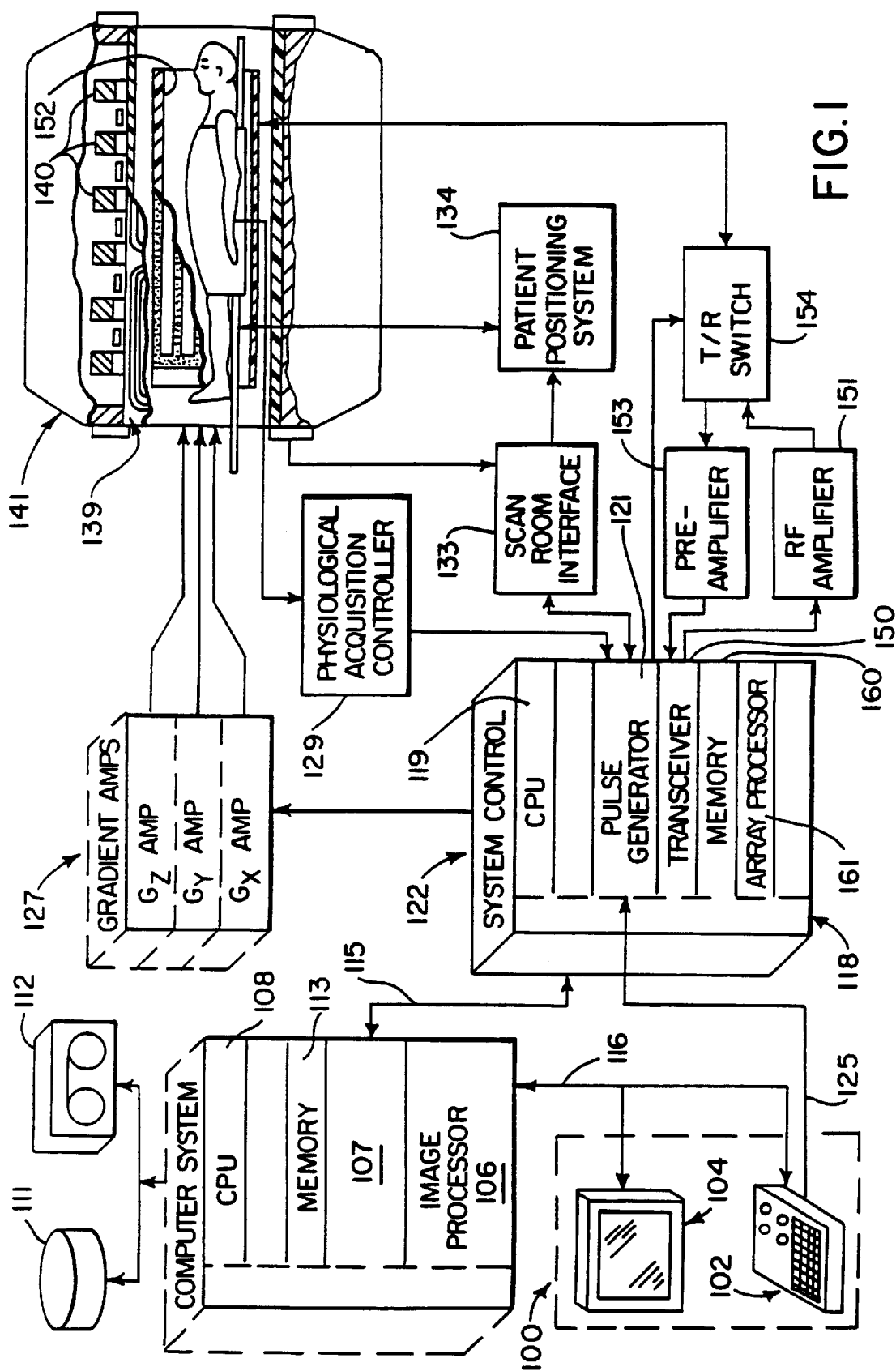
FIG. 1 is a block diagram of an MRI system which employs the present invention.

Referring first to FIG. 1, there is shown the major components of a preferred MRI system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. A transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk memory 111. In response to commands received from the operator console 100, this image data may be archived on the tape drive 112, or it may be further processed by the image processor 106 in accordance with the present invention and conveyed to the operator console 100 and presented on the display 104.

For a more detailed description of the transceiver 150, reference is made to U.S. Pat. Nos. 4,952,877 and 4,922,736 which are incorporated herein by reference.

Figure 2:
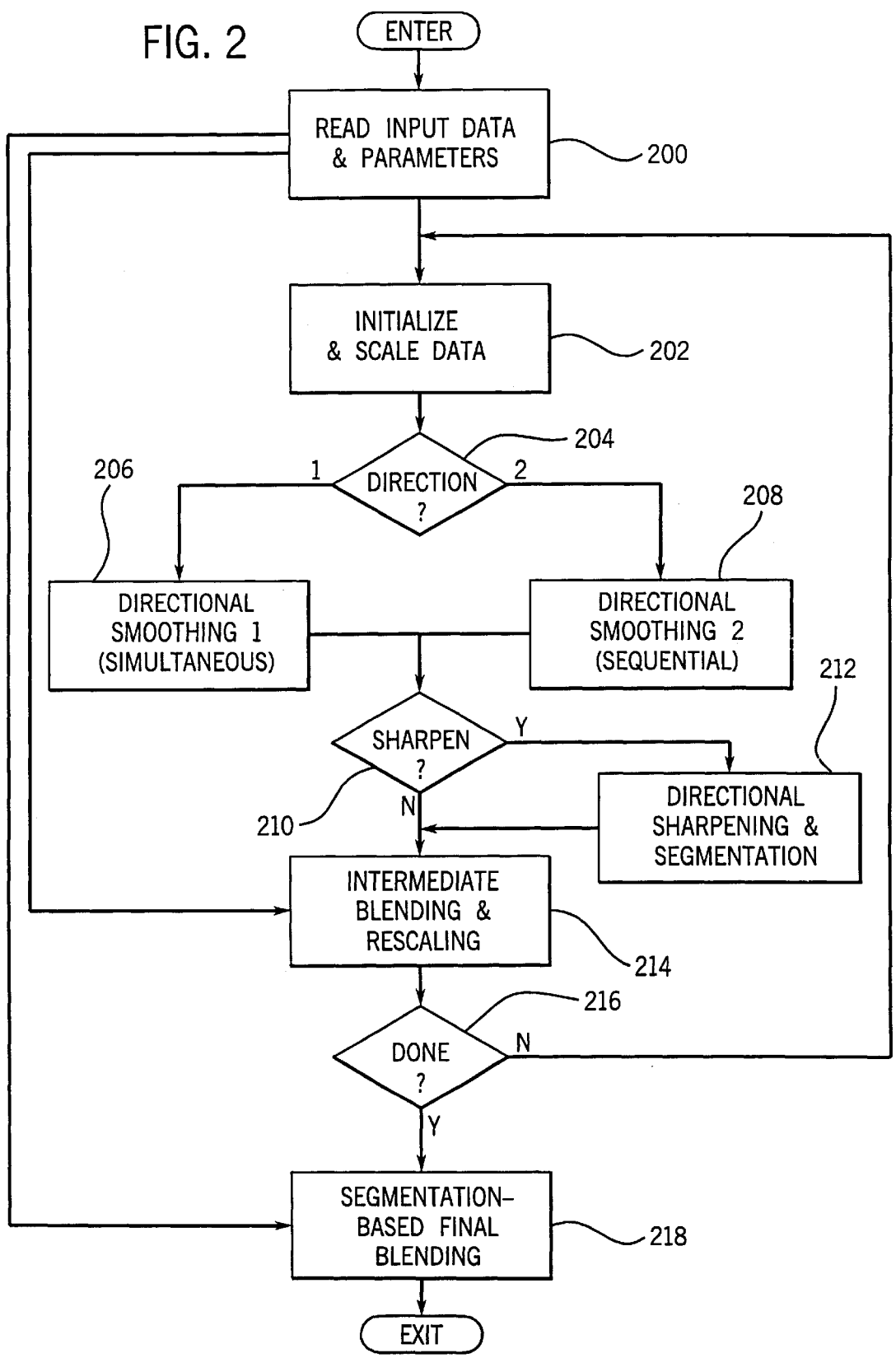
FIG. 2 is a flow chart of the functions performed by the MRI system of FIG. 1 to filter acquired images according to the preferred embodiment of the invention.

The present invention is implemented in the image processor 106 shown in FIG. 1 by carrying out the sequence of steps indicated by the flow chart in FIG. 2 on an image stored in digital form. The filtering process provides a multi-pass (iterative) framework with options for changing the parameters used during each pass. As shown by process block 200, eighteen parameters that control the filter process are input by the operator for the particular application. As will be described in more detail below, these parameters control the filtering effect which can range from complete smoothing of the image to complete sharpening of image features, as well as segmentation-based adaptive smoothing and sharpening. In research settings, the separate parameters may be specified by the operator, whereas in clinical settings, a group of stored parameters may be selected by the operator depending on the particular application.

As indicated at process block 202, the next step is to initialize the system for the multi-pass filter operation to be performed, and to scale the input image data. The main reason for scaling is to make the filtering functions independent of the dynamic range of the image data or its DC offset value. More specifically, the following steps are performed:

1) Internal parameters which will be discussed in the next section are initialized and the iteration counter is set to 1;
2) Maximum (MAX_ORIGINAL) and minimum (MIN_ORIGINAL) image intensity values are determined;
3) If the iteration number is 1, the original data is save as $I_2$;
4) scale=4095.0/MAX_ORIGINAL;
5) Scaled image I is obtained using the relation: I=(I-MIN_ORIGINAL)* scale;
6) Save the prefilteration image as $I_1$=I;
7) Compute the average image intensity value (MEAN_BEFORE) of I before filtering.

Because the MR image data has 12-bit precision, 4095/MAX_ORIGINAL is used for scaling. The image $I_1$ is used in an intermediate blending operation described below, while the stored image $I_2$ is used for a final blending operation also to be described below.

As indicated by decision block 204, either of two directional smoothing functions is performed on the image data. The choice is one of the 18 control parameters described above. One choice ("1") is a directional smoothing function indicated by process block 206 in which a simultaneous direction smoothing operation is applied to the image I. This simultaneous smoothing operation is described in L. S. Davis, "A Survey of Edge-Detection Techniques," Computer Graphics and Image Processing, volume 4, pp. 248–270, 1975. It employs the following steps:

1) Scan the image in the raster format one time.
2) At each image pixel, consider four 1-dimensional 3×1 filters in all the four directions (45°, 135°, 90°, 0°).
3) At each direction, compute the mean value and the variance of the 3 corresponding pixels.
4) Determine the direction which gives the minimum variance and choose the corresponding mean value for the subsequent calculations.
5) This new pixel value at the given location (x,y) is thus modified according to the equation:

$$I(x,y)=\text{mean}.$$

By design, this process smooths along the line structures and edges but not across them. The border pixels in a given image have to be treated differently and are set to zero in the processed image.

The other choice ("2") at decision block 204 is a sequential smoothing function indicated by process block 208. The smoothing function is applied to the image I and its function is described in P. Chan and J. S. Lim, "One-Dimensional Processing for Adaptive Image Restoration," IEEE Transactions In Acoustics, Speech and Signal Processing, volume 33, pp. 117–126, Feb. 1985. This sequential smoothing function employs the following steps:

1) Scan the image in the raster format four times.
2) At each pixel, consider four 1-dimensional 3×1 filters in all the four directions (45°, 135°, 90°, 0°) sequentially.
3) For one direction, compute the mean value and the variance of the 3 corresponding pixels and use these for the subsequent calculations.
4) If the variance (var) is greater than a preselected noise variance (nvar), then set var=var−nvar, otherwise, set var=0.
5) The new pixel value at the given location (x,y) is thus modified according to the equation:

$$0(x,y)=\text{mean}+(I(x,y)-\text{mean})*(\text{var}/\text{var}+\text{nvar}),$$

where 0 (x,y) is a temporary image. After all the points in the image are processed, set I(x,y)=0(x,y) at every point (x,y).
6) Repeat steps 3–5 for all the remaining direction angles.

With this filter function the amount of smoothing can be controlled using a single parameter, nvar. Since this is a sequential direction filtering, it is not cumulative. However, this approach has been found to produce minimal smoothing across edges while producing an overall stronger smoothing effect while preserving edges. The border pixels in a given image have to be treated differently and are set equal to zero in the processed image.

Regardless of which smoothing function is performed, the next step in the filter framework is to determine if the image edges are to be sharpened as indicated at process block 210. If they are, a directional sharpening and segmentation function is performed at process block 212. The functions performed by this filter function include the following:

1) The 1-D Laplacian of the image at every pixel in each of the 4 directions (0°, 45°, 90°, 135°) is obtained using the equation:

$$E(k)=2.0*I(k)-I(k-1)-I(k+1);$$

where the index x refers to the current location along a given direction, E(k) is the edge strength and I(k) is the intensity value at the pixel.

2) After computing all the four edge strengths at a given pixel, determine the maximum directional edge strength and use it in the subsequent steps as the edge strength $E(x,y)$ at that location.
3) Continue this process for all the pixels in the image. Border pixels in a given image have to be treated differently and are set equal to zero for the subsequent steps.
4) Smooth the edges of image $E(x,y)$ to produce a smoothed edge strength image $ES(x,y)$ by performing the following steps:
    a) Scan the image $E(x,y)$ in the raster format one time.
    b) At each pixel, consider four 1-dimensional 3×1 filters in all the four directions (45°; 135°, 90°, 0°).
    c) At each direction, compute the mean value and the variance of the 3 corresponding pixels.
    d) Determine the direction which gives the minimum variance and choose the corresponding mean value for the subsequent calculations.
    e) The new pixel value at the given location $(x,y)$ is thus modified according to the equation:

$$ES(x,y)=\text{mean}.$$

5) Determine the maximum and the minimum values of $ES(x,y)$. Select the greater of the absolute value of the maximum and the minimum as parameter MAX.
6) Compute the threshold value using the equation:

$$\text{threshold}=\text{MAX}/\text{threshold\_parameter},$$

where threshold_parameter is one of the eighteen selectable parameters.
7) In this step computations are performed based on decisions made using another one of the eighteen selectable parameters called $\text{segment}_{13}$ parameter. The decision logic also creates a mask called $\text{mask}(x,y)$. The parameters HPF_attenuated_parameter and HPF_unattenuated_parameter are also user selectable. These are used to essentially control the amount of edge strength image $ES(x,y)$ added back to the smoothed image $I(x,y)$ based on the segmentation criterion as determined in the following:
    a) If $\text{segment}_{13}$ parameter=1, perform the following:
        if $(ES(x,y)\geq=\text{threshold})$
            set mask$(x,y)$=1; and
            set $I(x,y)=I(x,y)+ES(x,y)*\text{HPF\_attenuated\_parameter}$; or
        if $ES(x,y)>\text{threshold}$
            set mask$(x,y)$=0; and
            set $I(x,y)=I(x,y)+ES(x,y)*\text{HPF\_unattenuated\_parameter}$;
    b) If segment_parameter=2, perform the following:
        if $(ES(x,y))>=-\text{threshold}$
            set mask$(x,y)$=1; and
            set $I(x,y)=I(x,y)+ES(x,y)*\text{HPF\_attenuated\_parameter}$; or
        if $(ES(x,y)<-\text{threshold})$
            set mask$(x,y)$=0; and
            set $I(x,y)=I(x,y)+ES(x,y)*\text{HPF\_unattenuated\_parameter}$;
    c) If segment_parameter=3, perform the following:
        if$(\text{abs}(ES(x,y))<=\text{threshold})$
            set mask$(x,y)$=1; and
            set $I(x,y)=I(x,y)+ES(x,y)*\text{HPF\_attenuated\_parameter}$; or
        if(abs $ES(x,y))=\text{threshold}$
            set mask$(x,y)$=0; and
            set $I(x,y)=I(x,y)+ES(x,y)*\text{HPF\_unattenuated\_parameter}.$ At the completion of the sharpening and segmentation process 212 we have differentially enhanced strong edges and weak edges and the image is separated into strong edge regions and weak edge regions.

As indicated by process block 214, the next function to be performed is a blending and rescaling operation in which the filtered imaged $I(x,y)$ is combined with the stored prefiltered image $I_1(x,y)$ and the combined image is rescaled. This operation includes the following steps.

1) The filtered image $I(x,y)$ and the prefilteration image $I_1(x,y)$ are blended using the equation:

$$I(x,y)=\text{alpha}*(I(x,y)-I_1(x,y))+I_1(x,y);$$

where alpha is one of the selectable parameters such that 0<alpha<1.
2) Compute the average pixel intensity (MEAN_AFTER) in the blended image $I(x,y)$.
3) Compute the normalization factor NORM_FACTOR= MEAN_BEFORE/MEAN_AFTER.
4) Compute the normalized image using: $I(x,y)=(I(x,y)*\text{NORM\_FACTOR})+\text{MIN\_ORIGINAL}$, where MIN_ORIGINAL is the minimum intensity of the original image.
5) Set the value of image $I_1(x,y)$ to be equal to image $I(x,y)$.

At the completion of process 214, a test is made at decision block 216 to determine if all the passes through the filter framework are complete. In the preferred embodiment three passes are performed by branching back to process block 202 to repeat all the selected filter functions on the image $I(x,y)$. The filter functions performed need not be the same during each pass. For example, it has been found that the best results are achieved when the simultaneous directional smoothing function 202 is performed during the first pass and the directional sharpening function 212 is performed during the final pass. Other than these, the operator can choose any functions during each iteration to achieve the desired effects.

The final function performed by the filter framework is a segmentation-based blending as indicated at process block 218. The purpose of this function is to maintain the texture of the original image in regions where there are no edges (i.e. low edge strength). The final image $I_f(x,y)$ is obtained by blending the filtered image $I(x,y)$ and the prefilteration image $I_2(x,y)$ using the equation:

if mask $(x,y)$=1, set $I_f(x,y)=\text{alpha\_f}*I(x,y)+\text{beta\_f}*I_2(x,y)$; or if mask$(x,y)$=0, set $I_f(x,y)=I(x,y);$ where alpha_f is the scaling factor, and alpha_f, and beta_f are two of the eighteen selectable parameters and mask $(x,y)$ is produced by process block 212 described above. Depending upon the selection of the parameters alpha_f and beta_f used in this process, one can obtain adaptive grey level compression and expansion. Various visual effects can thus be obtained as follows:
    if (alpha_f+beta_f)=1, no grey scale compression or expansion is performed, (i.e. beta_f=1−alpha_f);
    if (alpha_f+beta_f)>1, grey scale compression occurs to provide an overall smoothing effect.

If (alpha_f+beta_f)<1, contrast enhancement occurs to provide improved contrast.

There are 18 user selectable parameters for use in the preferred embodiment of the filter framework. Various visual effects are produced by different combinations of these parameters. In the following description the parameters are indicated as P[i], where i indicates the parameter number.

P[1]:
Description: Sets the upper limit for the sharpening process. This can be set equal to 4095 for 12-bit images.
Range: 4000–6000;

P[2]:
Description: Dampening factor to prevent weak edge amplification. This is set to 0.1 in the preferred embodiment.
Range: 0<P[2]<1.

P[3] and P[4]:
Description: Fractional texture blended from original image to weak edge regions of filtered image in the final stage of processing as determined by the segmentation mask. Set P[3] and P[4] appropriately to avoid "smushiness" while providing overall smoothness.
Range: 0<=P[3]<=10, 0<=P[4]<=10, where "=" stands for "less than or equal to."

P[5]:
Description: Multiplication factor (HPF_unattenuated_factor) to the edge image for adding edges back to the filtered image in the final pass. Select this parameter high (>0.2) to increase overall sharpness of strong edges. Never set this parameter equal to zero to avoid missing out on the segmentation step.
Range: 0.00001 <=P[5]<=5.

P[6]:
Description: Multiplication factor (HPF_unattenuated_factor) to the edge image for adding edges back to the filtered image in the penultimate iteration (pass number 2 in the preferred embodiment). Use this parameter if additional edge enhancement boost is needed for tasks such as making the dark structures darker and white edges whiter. This parameter can also be used to put some texture back in images while providing higher overall smoothness to the image.
Range: 0.0 <=P[6]<=5.

P[7], P[8], P[9]:
Description: Variance threshold for the first, the second and the third passes to control the amount of smoothing. These values are useful if and only if directional smoothing 2 is used. Setting these values too high tends to blur the image.
Range: 0.1<=P[7]<=10000000, 0.1<=P[8]<=10000000, 0.1<=P[9]<=10000000.

P[10], P[11], P[12]:
Description: These parameters represent the fractional post-pass filtered image blended in with pre-pass filtered image for each of the three passes.
Range: Range: 0<=P[10]<=1, 0<=P[11]<=1, 0<=P[12]<=1.

P[13], P[14], P[15]:
Description: Dampening factors (HPF_attenuated_factors) to prevent weak edges amplification in each of three iterations;
Range: Range: 0<=P[10]<=1, 0<=P[11]<=1, 0<=P[12]<=1.

P[16]:
Description: Control parameter to decide during which iteration directional smoothing 2 (block E) should be done instead of directional smoothing 1 (block D). Always use directional smoothing 1 for the first pass and use either of the smoothing schemes for the remaining passes.
Range: 1<=P[16]<=4.

P[17]:
Description: Reciprocal of this parameter (threshold_parameter) is multiplied to the maximum edge strength to determine the threshold for segmentation of the image into strong and weak edge regions.
Range 1<=P[17]<=200.

P[18]:
Description: This parameter (segment_parameter) determines which of the three segmentation modes is to be applied for filtering. The parameter is set equal to 1 when the user needs the white edges but not the black edges to be emphasized. The parameter is set to 2 when the black edges but not the white edges have to be emphasized. The parameter is set to 3 when all edges have to be emphasized.
Range: 1<=P[18]<=3.

While there are millions of possible parameter combinations, all of them are not useful. Therefore, it is important to tune parameters to get the desired filtering effects. In order to achieve these effects, the following guidelines can be used:

Strong edge regions: In general, for noisy images, the strong edges must be emphasized or kept the same as in the original. Smoothing can be performed along a strong edge, but should never be performed across it. This is important to avoid blurring of details in the image which is undesirable in medical images.

Weak edge region: As a rule of thumb, weak edge regions must be attenuated. Sharpening the weak edge regions in general increases the chance of noise amplification and the appearance of "worms" in MR images. The texture in these regions must be maintained to have natural appearance in order to avoid "smudging" and "smushing" of pixel intensities.

The following are exemplary parameter sets for use in the preferred embodiment of the invention to achieve specific visual effects.

EXAMPLE FILTER 1

Short description: Sharpen with very little smoothing.
Detailed description: This is an overall filter with very little smoothing to enhance structural edges.
Suggested usage: High signal, very low noise 256×256 pixel images such as head, abdomens and extremities.
Parameter Combination
P[1]=4095;
P[2]=0.1;
P[3]=0.0;
P[4]=1.0;
P[5]=0.75;
P[6]=0.0;
P[7]=800000.;
P[8]=8000.;
P[9]=8000.;
P[10]=0.45;

P[11]=0.45;
P[12]=0.45;
P[13]=0;
P[14]=0;
P[15]=0.04;
P[16]=4;
P[17]=15;
P[18]=3;

EXAMPLE FILTER 2

Short description: Sharpen with smoothing.

Detailed Description: This is an overall sharpening filter with smoothing to enhance structural edges and suppress noise.

Suggested usage: Extremities.

Parameter Combination
P[1]=4095;
P[2]=0.1;
P[3]=0.7;
P[4]=0.3;
P[5]=0.6;
P[6]=0.45;
P[7]=800000.;
P[8]=8000.;
P[9]=8000.;
P[10]=0.45;
P[11]=0.45;
P[12]=0.45;
P[13]=0;
P[14]=0;
P[15]=0.04;
P[16]=3;
P[17]=15.;
P[18]=2;

EXAMPLE FILTER 3

Short description: High smooth and very little sharpen.

Detailed description: Overall this filter produces smoothing and very little sharpening to suppress noise and provides smoother structural edges.

Suggested usage: High resolution, low signal images.

Parameter Combination
P[1]=4095;
P[2]=0.1;
P[3]=0.8;
P[4]=0.45;
P[5]=0.01;
P[6]=0.1;
P[7]=800000.;
P[8]=8000.;
P[9]=8000.;
P[10]=1.0;
P[11]=1.0;
P[12]=1.0;
P[13]=0;
P[14]=0;
P[15]=0.001;
P[16]=2;
P[17]=1.0;
P[18]=1;

The invented filter provides a framework of selectable functions which when used in a multi-pass manner provide a variety of filtering functions that are performed in an efficient manner using 3=1 one-dimensional computations. This framework is capable of producing smoothing and sharpening depending upon edge strength of the region and it therefore produces varying filtration effects which are considered useful by radiologists. Since the weak edge regions are attenuated but never completely removed and strong edges are always smoothed along but never across, visually pleasing results can be obtained. Furthermore, the framework provides multilevel control to obtain sharpness and smoothness. Examples of the parameter combinations illustrate various visual effects that can be achieved using the present invention with high field MR images. Results indicate the proposed framework will also work well for all MRI systems with different strengths, but the parameter values should be separately tuned to obtain optimal results.

What is claimed is:

1. In a medical imaging system, the combination comprising:

means for acquiring image data from a patient;

means for reconstructing an image data set from the acquired image data; and a filter framework for receiving the image data set and in response to a set of parameters selected by an operator, producing a filtered image data set; wherein the filter framework comprises:

a) a smoothing filter;

b) a sharpening filter;

c) means responsive to the set of parameters for processing the image data set a plurality of passes through the filter framework to produce the filtered image data set, the means for processing being operable to determine the filters to be employed during each pass through the framework and the number of passes through the framework.

2. The medical imaging system as recited in claim 1 in which the filter framework includes means for combining a portion of the filtered image data with a portion of the image data to form the filtered image data set.

3. The medical imaging system as recited in claim 2 in which the portion of the filtered image data is determined by a scaling factor parameter $\alpha$ and the portion of the image data is determined by the value $1-\alpha$.

4. The medical imaging system as recited in claim 1 in which the filter framework includes: segmentation means for separating the filtered image data into first region containing edge information and second regions containing substantially no edge information; and means for combining the image data and the filtered image data in a manner determined by the first and second regions identified by the segmentation means.

5. The medical imaging system as recited in claim 1 in which the filters employ a 3×1 filter kernel.

6. A method for producing a medical image, the steps comprising:

a) acquiring image data from a patient;

b) reconstructing an image data set from the acquired image data;

c) producing an intermediate image by filtering the image data set;

d) blending the intermediate image with the image data set to produce a filtered image data set; by:

i) multiplying the intermediate image by a factor $\alpha$;

ii) multiplying the image data set by a factor $(1-\alpha)$; and iii) combining the results of steps i) and ii) to form the filtered image data set;

e) repeating steps c) and d) a set number of times using the filtered image data set in place of the image data set; and f) producing the medical image from the filtered image data set.

7. The method as recited in claim 6 in which the blending in step d) is performed by:

multiplying the intermediate image by a scaling factor α; and multiplying the image data set by a factor (1-α).

8. The method as recited in claim 7 in which the scaling factor α is changed during each pass through step d).

9. The method as recited in claim 7 in which the scaling factor α is a manually selected value.

10. The method as recited in claim 6 in which step e) is performed a plurality of times.

11. The method as recited in claim 6 in which the filtering in step c) includes using a smoothing filter during one pass.

12. The method as recited in claim 6 in which the filtering in step c) includes using a sharpening filter during one pass.

13. The method as recited in claim 6 in which the filtering in step c) includes using a directional sharpening and segmentation process during the last process.

14. The method as recited in claim 6 in which the filtering in step c) includes using a smoothing filter during one pass and a sharpening filter during another pass.

15. The method as recited in claim 6 which includes combining the filtered image data set with the image data set before producing the medical image therefrom in step f).

16. The method as recited in claim 15 which includes segmenting the filtered image data set into a first set of regions having strong edges and a second set of regions having weak edges, and the image data set is combined with the second set of regions.

17. The method as recited in claim 15 in which the data in the image data set corresponding to the second set of regions replaces the data in the filtered image data set corresponding to the second set of regions.

* * * * *

UNITED STATES PATENT AND TRADEMARK OFFICE
CERTIFICATE OF CORRECTION

PATENT NO. : 6,246,783 B1
DATED : June 12, 2001
INVENTOR(S) : Gopal B. Avinash

It is certified that error appears in the above-identified patent and that said Letters Patent is hereby corrected as shown below:

Column 7,
Line 36, "segment$_{13}$parameter", should be -- segment_parameter --.
Line 44, "segment$_{13}$parameter", should be -- segment_parameter --.

Column 9,
Line 25, "where "=" stands", should be -- "where "<=" stands --.

Column 12, claim 1,
Line 30, after the word "determine", insert -- from the set of parameters --.
Line 31, after the word "and", insert -- to determine from the set of parameters --.

Column 13, claim 7,
Was canceled by Amendment dated 09/20/1999 and the subject matter added to Claim 6.

Signed and Sealed this

Ninth Day of April, 2002

JAMES E. ROGAN
Director of the United States Patent and Trademark Office

Attest:

Attesting Officer